K. O. E. OLAUSSON.
SMELTING FURNACE.
APPLICATION FILED SEPT. 6, 1911.
1,081,912.
Patented Dec. 16, 1913.
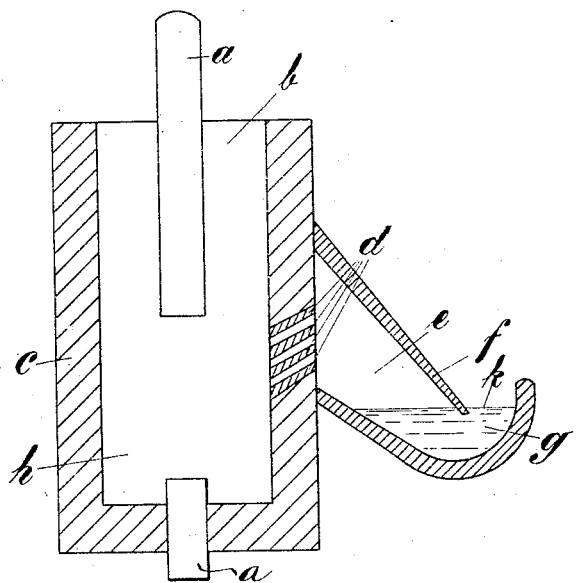
Witnesses:
Inventor:

UNITED STATES PATENT OFFICE.

KARL OSKAR ERNFRID OLAUSSON, OF TROLLHÄTTAN, SWEDEN, ASSIGNOR TO TROLL-HÄTTANS ELEKTROTHERMISKA AKTIEBOLAG, OF STOCKHOLM, SWEDEN.

SMELTING-FURNACE.

1,081,912.  Specification of Letters Patent.  Patented Dec. 16, 1913.

Application filed September 6, 1911. Serial No. 647,898.

*To all whom it may concern:*

Be it known that I, KARL OSKAR ERNFRID OLAUSSON, a subject of the King of Sweden, residing at Trollhättan, in the Kingdom of Sweden, have invented certain new and useful Improvements in Smelting-Furnaces, of which the following is a specification.

The present invention has reference to a furnace especially designed for smelting and reducing zinc and lead ores, and is characterized by the fact that the condensable gases are separated from the non-condensable gases owing to the difference in their specific weights, in condensing chambers arranged outside the smelting chamber and communicating with the same or with the shaft, in such a manner that the condensable gases sink to the bottom of the condensing chamber and are condensed, while the non-condensable gases escape through the furnace shaft.

The accompanying drawing shows in vertical section an electric zinc furnace according to the present invention.

The furnace consists of a smelting chamber $h$ the upper portion of which forms the shaft $b$. The electric current is supplied to the charge, introduced in the smelting furnace, through the electrodes $a$, entering the charge through the furnace walls or through the shaft. Part of the zinc-gases evolved during the reducing process, rises in the shaft, whereupon the zinc is condensed and again descends together with the charge and is again volatilized thereby enriching the mixture of zinc vapors and carbon monoxid in the reduction chamber.

Outlets $d$ are provided in the furnace walls through which the zinc gases and part of the carbon dioxid evolved during the reduction process escape to the condensing chamber $e$ which as shown on the drawing is downwardly inclined. The bottom of said condensing chamber forms a liquid seal $g$ comprising with the wall $f$ a completely inclosed space whereby the condensing chamber is shut off from the atmosphere. The said outlets $d$ are preferably upwardly directed so as to prevent the charge from entering the condensing chamber. When the mixture of zinc vapors and carbon monoxid has been enriched with zinc vapor as above described the mixture becomes heavy and does not follow the draft in the shaft $b$ but enters the condensing chamber through the openings $d$. Owing to their gravity the zinc gases sink to the bottom of the condensing chamber, while the lighter carbon monoxid follows the draft in the shaft $b$ and escapes through the furnace shaft. The zinc is condensed and by reason of the fact that the gas outlet $k$ is shut off by the liquid seal all the non-condensable gases escape through the shaft $b$.

What I claim and desire to secure by Letters Patent of the United States is:—

1. In an electric furnace in combination with the smelting chamber, electrodes for supplying an electric current to the charge within the said smelting chamber, a condensing chamber arranged outside the furnace, and a single means for conducting gases, evolved during the reduction of the ore, to the condensing chamber, in which the condensable gases are separated from the non-condensable gases owing to the difference in their specific weights, and reconducting non-condensable gases from the condensing chamber to the furnace.

2. In an electric furnace in combination with the smelting chamber, the upper portion of which forms the shaft, electrodes for supplying an electric current to the charge within the said smelting chambers, a liquid sealed condensing chamber arranged outside the furnace and a single means for conducting gases, evolved during the reduction of the ore, to the condensing chamber, in which the condensable gases are separated from the non-condensable gases owing to the difference in their specific weights, and reconducting non-condensable gases from the condensing chamber to the furnace.

3. In an electric furnace in combination with the smelting chamber the upper portion of which forms the shaft electrode for supplying an electric current to the charge within the said smelting chamber a liquid sealed condensing chamber, arranged outside the furnace and extending in a downwardly inclined direction from the smelting chamber, and a single means for conducting gases, evolved during the reduction of the ore, to the condensing chamber, in which the condensable gases are separated from the non-condensable gases owing to the difference in their specific weights, and for re-conducting non-condensable gases from the condensing chamber to the furnace.

In testimony whereof I affix my signature in presence of two witnesses.

KARL OSKAR ERNFRID OLAUSSON.

Witnesses:
R. NILSON,
H. TILLBERG.